3,201,374
TERPOLYMERS CONTAINING AT LEAST 65% ETHYLENE

John A. Simms, Wilmington, Del., assignor to E. I. du Pont de Nemours and Company, Wilmington, Del., a corporation of Delaware
No Drawing. Filed June 21, 1961, Ser. No. 118,521
12 Claims. (Cl. 260—80.5)

This invention relates to ethylene copolymers and particularly to copolymers of (a) ethylene with (b) certain ester monomers and (c) certain other monomers.

It is an object of the invention to provide new ethylene copolymers. A particular object is to provide new copolymers of ethylene with certain ethylenically unsaturated esters and certain other ethylenically unsaturated monomers, which copolymers are especially well suited for adhesive and coating purposes. Further objects of the invention will be apparent from the following description.

The copolymers of the invention are copolymers, i.e., terpolymers, of (a) at least 65% by weight of ethylene; (b) at least 5% by weight of a second ethylenically unsaturated monomer which is an ester of the group consisting of the alkyl acrylates, the alkyl methacrylates, the dialkyl maleates and the dialkyl fumarates of the lower (1–6 carbon) monohydric primary aliphatic alcohols; and (c) 0.01 to 10% by weight of a third ethylenically unsaturated monomer of the group consisting of: the monoacrylates and monomethacrylates of glycols; 2-hydroxy-3-aminopropyl allyl ether, allyl glycerol ether, 2-dimethylaminoethyl acrylate, 2-dimethylaminoethyl methacrylate and N-vinyl pyrrolidone; acrylic and methacrylic acids.

For the sake of convenience, the ester monomers of the above group (b) are referred to hereinafter simply as "group (b) monomers," and the monomers of the above group (c) are referred to simply as "group (c) monomers."

Illustrative of the group (b) monomers used in preparing the copolymers of the invention are: the methyl, ethyl, n-propyl, n-butyl, n-amyl and n-hexyl acrylates and methacrylates; and the dimethyl, diethyl and di-n-propyl maleate and fumarates. The preferred group (b) monomers are ethyl acrylate and methyl methacrylate.

Illustrative of the group (c) monomers used in preparing the copolymers of the invention are: the monoacrylates and monomethacrylates of the glycols such as ethylene glycol, 1,2-propylene glycol, 1,4-butanediol and 1,6-hexanediol; 2-dimethylaminoethyl acrylate and 2-dimethylaminoethyl methacrylate; 2-hydroxy-3-aminopropyl allyl ether, allyl glycerol ether and N-vinyl pyrrolidone; and acrylic and methacrylic acids. The preferred group (c) monomers are acrylic acid and methacrylic acid.

The copolymers of the invention which are particularly preferred because of their generally excellent properties and because their monomer components are relatively cheap and readily available, are those prepared employing ethyl acrylate or methyl methacrylate as the group (b) monomer and acrylic acid or methacrylic acid as the group (c) monomer.

The copolymers of the invention have been found to possess excellent adhesive, solubility and other properties desired for general coating and adhesive purposes. Thus, they are well suited for various adhesive uses and for use in modifying petroleum waxes for coating and sealing purposes.

The generally poor solubilty of ethylene homopolymers in petroleum waxes and solvents, such as benzene, toluene, xylene, trichloroethylene and perchloroethylene, is related at least in part to their relatively high crystallinity. The present copolymers are relatively soluble in or compatible with the above materials, apparently because they are either amorphous or possess a low degree of crystallinity. The copolymer component which is chiefly responsible for reducing or eliminating crystallinity of the copolymer (and increasing its compatibility with the above materials) is the group (b) monomer component thereof. Worthwhile reduction of crystallinity results from the presence of as little as 5% by weight of that component in the copolymer. Thus, an ethylene homopolymer having a melt index of 10 was shown by X-ray diffraction methods to have a crystallinity of about 60%, whereas a copolymer containing 12.1% ethyl acrylate, 1.2% methacrylic acid with the balance ethylene and having a melt index of 5.7 showed a crystallinity of only about 27%. Reduction of crystallinity increases as the content of the group (b) monomer is increased up to about 30% by weight, at which content copolymer crystallinty becomes substantially insignificant. However, wax compatibility again decreases as the group (b) monomer content is increased beyond about 35% and copolymers containing more than that amount of that component are not generally suitable for the present purposes. The group (b) monomer content preferably will be at least 12% of the copolymer weight, the most preferred range being 20 to 30%.

In contrast with ethylene homopolymers, which have poor adhesive properties, the present copolymers have excellent adhesive and curing properties which appear to be due chiefly to the group (c) monomer component thereof. As little as 0.01% by weight of the group (c) monomer component based upon the weight of the copolymer exerts a significant and worthwhile improvement in the adhesive properties and renders the copolymer curable. Group (c) monomer contents greater than about 10% are generally not required to obtain the desired adhesive and curing properties.

One important use of the present copolymers is as modifiers of petroleum waxes for coating and sealing applications. For such use, the group (c) monomer content of the copolymer preferably will not exceed 3% by weight of the copolymer, since greater amounts adversely affect the compatibility of the copolymer with petroleum plications. For such use, the group (c) monomer contents of the copolymers for use in modifying petroleum waxes range from 0.1 to 1% by weight.

Other uses for the present copolymers are as hot-melt adhesives, in coating papers and fabrics and as binders in the production of non-woven fabrics. For such uses, the group (c) monomer content of the copolymer may range up to about 10%, but the generally preferred range is about 0.1 to 7% of the copolymer weight.

The copolymers of the invention can be readily prepared by copolymerizing a mixture of the comonomers in the presence of a free-radical polymerization initiator such as a peroxygen compound, e.g., lauryl peroxide or t-butyl peracetate, or an azobis compound, e.g., azobisisobutyronitrile, in a pressure reactor at a somewhat elevated temperature, e.g., 90–250° C., and a pressure of 1000 to 1750 atmospheres, then separating the copolymer from the unpolymerized materials, e.g., by vaporizing the latter. By varying the monomers employed, the concentrations of the monomers and initiator in the reaction mixture, and conditions such as reaction time, pressure and temperature, copolymers of the desired kind and degree of polymerization can be readily obtained. Batch polymerization methods may be used but, since they tend to give non-homogeneous copolymers, they are not preferred. Continuous methods in which a suitable mixture of the comonomers and initiator are continuously passed through a reaction zone maintained at the desired temperature and pressure are distinctly preferred, since they yield substantially homogeneous copolymer products. The reaction zone and the rate of flow of the reaction mixture therethrough should be such as to provide an appropriate residence time.

The melt index (M.I.) of a polymer is well recognized as being related to its molecular weight, the lower the melt index the higher being the molecular weight. The melt index values reported herein were determined by the tentative ASTM test method D1238–52T (ASTM Standards, 1955, Part 6, pages 292–295). Each value is the weight in grams of a specific copolymer that is extruded through an orifice 0.0825 inch in diameter and 0.315 inch long over a period of 10 minutes at 190° C. under a pressure of 2160 grams. The melt index values of the copolymers of the invention range from 0.5 to 200, preferably about 5 to 25.

The term "petroleum wax" as used herein embraces both paraffin and microcrystalline waxes. Paraffin waxes are mixtures of solid hydrocarbons derived through the fractional distillation of petroleum. After purification, they contain hydrocarbons that fall within the formula range of $C_{23}H_{48}$-$C_{29}H_{60}$. They are colorless, hard, translucent materials having melting points of about 130–165° F. Microcrystalline waxes are also obtained through petroleum distillation. They differ from paraffin waxes in being more branched and of higher molecular weight. They are more plastic than paraffin waxes and have melting points of about 165–200° F. Paraffin waxes are generally preferred over microcrystalline waxes for blending with the present copolymers for coating purposes because they provide better moisture proofing and are generally of better color.

The invention is illustrated by the following examples. All proportions expressed herein as percentages are by weight.

*Example 1*

Ethylene, ethyl acrylate, methacrylic acid and benzene (solvent) were fed continuously at rates, respectively, of about 5.37, 0.174, 0.015 and 2.87 lbs./hr. into and through a two-liter stirred autoclave maintained at 190° C. and a pressure of 1430 atmospheres. t-Butyl peracetate initiator was also fed continuously at a rate equivalent to about 0.116 lb./1000 lbs. of polymer product. The residence time in the autoclave was 16.7 minutes. The reaction mixture continuously removed from the autoclave was stripped of unpolymerized monomers and solvent under reduced pressure and at elevated temperature. After operations had reached a steady state, the conversion of monomers to copolymer was 12.85%. The copolymer had a melt index of 7.2 and contained 13.5% ethyl acrylate and 1.7% methacrylic acid (the balance being ethylene).

Copolymers prepared using ethyl acrylate and acrylic acid as the comonomers and containing 10.0% and 7.0% of the former and 6.0% and 4.0% of the latter, respectively, had melt indexes of 6.3 and 4.6.

*Example 2*

In an operation similar to that described in Example 1 except that methyl acrylate was used in place of ethyl acrylate, the initiator was benzoyl peroxide and the temperature was 161° C., there was produced an ethylene/methyl acrylate/methacrylic acid copolymer containing about 14% methyl acrylate and 2.3% methacrylic acid. Its melt index was 1.87.

*Example 3*

Several copolymers of ethylene with from about 12–16% ethyl acrylate and from about 0.2 to 3% methacrylic acid and having melt index values ranging from 3.1 to 7.7 were prepared by the general method described in Example 1. The copolymers were used as adhesives to prepare laminates of paper and aluminum foil in a Carver press at 150° C., 4000 p.s.i., 30 seconds contact time. After cooling to room temperature, the laminates were stripped apart by hand. Excellent adhesion was obtained since stripping resulted only in fiber tear with no separation of the copolymer from the foil. Similar results were obtained using a copolymer of ethylene with about 14% ethyl acrylate and 1% acrylic acid having a melt index of 5.

*Example 4*

An ethylene/ethyl acrylate/methacrylic acid copolymer containing 15% ethyl acrylate and 1% methacrylic acid was prepared by the general method of Example 1. Its melt index was 8.9. A 10% blend thereof with a paraffin wax (M.P., 62° C.) had a haze point of 68° C. Paper was coated on two sides with the blend using a Mayer Machine Company laboratory waxing machine in which the coating composition is applied by rollers and is metered by metal scraping blades. The coating weight was 15 lbs./ream. The coated paper had a blocking temperature of 118° F. Its water vapor transmission (WVT) rate was 0.6 for the flat value and 3.5 for the crease value. It gave heat-seal strengths of: paper to paper, 67; paper to glassine, 26; and paper to aluminum, 70.

As reported herein, the "haze point" of a copolymer-wax blend is the temperature (° C.) at which a melt of the blend shows the first sign of phase separation, as indicated by the development of a distinct haze, upon being cooled at a rate of 1° C. per minute.

All "blocking temperatures" reported were determined by TAPPI Suggested Method T652SM–57.

The "heat-seal strengths" reported were determined by TAPPI Suggested Method T642SM–54. They represent the force in grams required to separate sealed strips of paper one inch wide (g./in.) from a substrate. The "paper to paper" values are those for seals between the coated sides of two strips of paper. The other values reported, unless indicated otherwise, are for seals between the coated side of a strip of paper and the uncoated side of a substrate such as glassine or an aluminum foil. The seals tested were made on a Palo Myers sealer and the seal strengths were measured on an Instron tensile tester.

The "water vapor transmission" (WVT) rates represent the weight in grams of water vapor permeating 100 in.$^2$ of sample in 24 hrs. at 100° F. and 98% relative humidity. The test method used was essentially that of TAPPI Method T464M–45. Flat and crease values are reported. In determining the crease values for paper coated with a wax blend containing 10% copolymer, the TAPPI method was modified by employing a ratio of linear crease (in.) to area (in.$^2$) of 1.63 with no crossover of creases.

*Example 5*

A copolymer of ethylene with 13% ethyl acrylate and 1% acrylic acid, prepared as generally described in Example 1 and having a melt index of 7, was melt-blended with a paraffin wax melting at 62° C. The blend, which contained 10% of the copolymer, had a haze point of 70.5° C. Paper was coated on two sides with the blend as described in Example 5, the coating weight being 14 lbs./ream. The coated paper had a blocking temperature of 128° F. Its water vapor transmission rate was 1.1 for the flat value and 5.4 for the crease value. Its heat-seal strengths were: paper to paper, 31; paper to glassine, 16; and paper to aluminum, 38.

*Example 6*

In an operation similar to that of Example 1, except that methyl methacrylate was used in place of ethyl acrylate, the autoclave was maintained at 160° C. and a pressure of 1500 atmospheres and benzoyl peroxide was used as the initiator, there was produced an ethylene/methyl methacrylate/methacrylic acid copolymer containing 23.6% methyl methacrylate and 1.5% methacrylic acid. Its melt index was 9.2. A 10% blend of the copolymer in a paraffin wax (M.P., 62° C.) had a haze point of 68° C.

Paper coated with the above blend at a 14.8 lbs./ream coating weight had a blocking temperature of 118° F. Its WVT rate was 0.6 for the flat value and 3.5 for the crease value. It gave heat-seal strengths (after sealing at 225° F./30 p.s.i./2 sec.) of: paper to paper, 67; paper to glassine, 26; paper to aluminum, 70. A similarly coated paper was prepared using a similar wax-copolymer blend except that the copolymer was an ethylene/methyl methacrylate copolymer containing 21.1% methyl methacrylate and having a melt index of 4.2. This wax blend had a haze point of 71° C. The WVT rate for the coated paper was 1.2 for the flat value and 4.0 for the crease value. Its heat-seal strengths were: paper to paper, 29; paper to glassine, 10; and paper to aluminum, 36.

*Example 7*

In an operation similar to that of Example 1 except that n-butyl methacrylate was used in place of ethyl acrylate and the autoclave was maintained at 183° C. and a pressure of 1450 atmospheres, there was produced an ethylene/n-butyl methacrylate/methacrylic acid copolymer containing about 14% n-butyl methacrylate and 1.5% methacrylic acid. Its melt index was 8.0. A 10% blend thereof in a paraffin wax (M.P., 62° C.) had a haze point of 67° C. When used as an adhesive to prepare laminates of paper and aluminum foil, the 100% copolymer showed excellent adhesion leading to fiber tear upon attempted delamination.

*Example 8*

An ethylene/ethyl acrylate/2-hydroxyethyl methacrylate copolymer containing 9.7% ethyl acrylate and about 3% 2-hydroxyethyl methacrylate and having a melt index of 7.0, was prepared by the general method of Example 1 at a reaction temperature of 203° C. A 10% blend thereof in a paraffin wax (M.P., 62° C.) had a haze point of 78.5° C. When the blend was applied to paper as described in Example 9, it gave the following heat-seal strengths: paper to paper, 41; paper to glassine, 76; paper to aluminum, 63.

*Example 9*

An ethylene/ethyl acrylate/2 - dimethylaminoethyl methacrylate copolymer containing 12.1% ethyl acrylate and 0.8% 2-dimethylaminoethyl methacrylate and having a melt index of 7.9 was prepared by the general method of Example 1 at a reaction temperature of 196° C. A 9% blend thereof in a paraffin wax (M.P., 62° C.) had a haze point of 73° C. The blend was applied with a doctor blade at a coating weight of 10 lbs./ream to both paper and the second substrate under examination and the halves were then heat-sealed on a Palo Myers sealer at 210° F. with a 200 g. weight. The following heat-seal strengths were observed: paper to paper, 140 and paper to glassine, 76.

*Example 10*

An ethylene/ethyl acrylate/2-hydroxy-3-aminopropyl allyl ether copolymer containing 14.2% ethyl acrylate and 0.7% of the ether monomer (which was prepared by prior reaction of allyl glycidyl ether with aqueous ammonia) and having a melt index of 4.1 was prepared by the general method of Example 1 at a reaction temperature of 189° C. A 10% blend thereof in a paraffin wax (M.P., 62° C.) had a haze point of 80° C. When used as an adhesive to prepare laminates of paper and aluminum foil, the copolymer showed excellent adhesion to paper and good adhesion to aluminum.

*Example 11*

An ethylene/ethyl acrylate/allyl glycerol ether copolymer containing 13.3% ethyl acrylate and about 3% of the ether monomer and having a melt index of 4.1 was prepared by the general method of Example 1 at a reaction temperature of 185° C. A 10% blend thereof in a paraffin wax (M.P., 62° C.) had a haze point of 74° C. When a 9% blend of the copolymer in wax was applied to paper as described in Example 11, it gave the following heat-seal strengths: paper to paper, 138; paper to glassine, 88; and paper to aluminum, 70.

*Example 12*

An ethylene/ethyl acrylate/N-vinyl pyrrolidone copolymer was prepared by the general method of Example 1 at 200° C. The copolymer contained 13% ethyl acrylate and about 1% N-vinyl pyrrolidone. Its melt index was 3.1. A 5% blend thereof in a paraffin wax (M.P., 62° C.) had a haze point of 70.5° C.

*Example 13*

Portions of an ethylene/ethyl acrylate/methacrylic acid copolymer containing about 14% ethyl acrylate and 1.2% methacrylic acid, the balance being ethylene, were diluted by blending with various amounts of an ethylene/ethyl acrylate copolymer containing 85% ethylene and 15% ethyl acrylate to give a ladder of over-all methacrylic acid levels. Each copolymer blend was then blended with a paraffin wax to give wax-copolymer blends containing 90% wax which were coated on paper (one side) using a doctor blade and heat-sealed to uncoated glassine at 250° F., 300 grams weight, on a Palo Myers sealer. The heat-seal strengths found were:

| Methacrylic acid in copolymer blend (percent): | Heat-seal strength (g./in.) of wax-copolymer blend |
|---|---|
| 1.2 | 124 |
| 0.012 | 120 |
| 0.0012 | 41 |
| 0.00012 | 5 |
| 0.000012 | 5 |

These results show that an over-all methacrylic acid content of 0.01% in the copolymer blend is essentially as effective as a content 100 times greater in wax blends containing 10% copolymer.

*Example 14*

An ethylene/methyl methacrylate copolymer containing 80.9% ethylene and 19.1% methyl methacrylate and having a melt index of 5 was dissolved in a refined paraffin wax having a melting point of 62° C. The resulting blend contained 10% of the copolymer and had a haze point of 72° C. Paper coated on two sides at a coating weight of 15 lbs./ream had heat-seal strengths of: paper to paper, 52; paper to glassine, 6; and paper to aluminum, 34.

A corresponding wax-copolymer blend was prepared using an ethylene/methyl methacrylate/methacrylic acid copolymer containing 79.3% ethylene, 19.3% methyl methacrylate and 1.4% methacrylic acid and having a melt index of 5. The blend had a haze point of 74° C. The vapor transmission rate for paper coated with the blend on two sides at a coating rate of 15 lbs./ream was 0.7 for the flat value and 3.6 for the crease value. The heat-seal strengths were: paper to paper, 54; paper to glassine, 20; and paper to aluminum, 55. The last two heat-seal values are markedly superior to those for the above wax blend with the copolymer devoid of methacrylic acid.

*Example 15*

A flexible coated paper was prepared by coating a titanium dioxide coated sulfite paper on one side using a Meyer Coating Machine with a paraffin wax-copolymer blend at a coating weight of 10.2 lbs./ream. The blend contained 70% wax and 30% of an ethylene/ethyl acrylate/acrylic acid copolymer containing 14% ethyl acrylate and 1% acrylic acid. The coated paper had a WVT rate of 1.8 for the flat value and 2.5 for the crease value. Its heat-seal strengths were: paper to paper, 265; and paper to aluminum, 240.

*Example 16*

A flexible coated paper was prepared as indicated in Example 15 using a petroleum wax-copolymer blend containing 30% of an ethylene/methyl methacrylate/methacrylic acid copolymer (M.I., 9.2) containing 23.6% methyl methacrylate and 1.5% methacrylic acid. The coating weight was 13.2 lbs./ream. The coated paper had a blocking temperature of 111° F. and a WVT value of 1.4 for the flat value and 2.5 for the crease value. Its heat-seal strengths were: paper to paper, 310; paper to aluminum, 170; paper to cellophane, 240; and paper to a polyester film, 186.

*Example 17*

Example 16 was repeated using in the wax blend an ethylene/ethyl acrylate/methacrylic acid copolymer (M.I., 1.1) containing 21.3% ethyl acrylate and 1% methacrylic acid. The coated paper gave heat-seal strengths of: paper to paper, 316; paper to aluminum, 140; paper to cellophane, 26; and paper to a polyester film, 40.

The copolymers of the invention are in general soluble in petroleum waxes and solvents such as benzene, toluene, xylene, trichloroethylene and the like. They can be cured by reacting the carboxyl, hydroxyl and/or amino groups thereof with various agents whereby they are converted to tough, pliable, elastic, insoluble materials resistant to plastic flow at elevated temperatures.

Suitable curing agents, which effect cross-linking, include polyfunctional oxirane compounds, such as 2,2-bis(p-glycidoxyphenyl) propane; and formaldehyde derivatives of polyfunctional amines, such as butylated melamine-formaldehyde resin. The presence of an accelerator, such as monobutyl hydrogen orthophosphate, may also be desired. Blends of the copolymer with the curing agent, accelerator and, if desired, auxiliary materials to impart specific effects, can be applied to fabric by calendering or spreading from solution, and the coated fabric can be cured by heating for 0.01 to 4 hrs. at 100 to 210° C.

The copolymers of the invention are well suited for many uses as hot-melt adhesives since they adhere readily to many dissimilar surfaces such as paper, paperboard, glassine, aluminum, "Bonderized" steel and polyvinyl fluoride film. Their excellent adhesive and other desirable properties also make them valuable for use as petroleum wax modifiers in the production of wax blends for many coating applications such as the coating of paper. They are also potentially useful as adhesives in preparing nonwoven fabrics.

The embodiments of this invention in which an exclusive property or privilege is claimed are defined as follows:

1. A terpolymer of (a) at least 65% by weight of ethylene; (b) at least 5% by weight of an ester of the group consisting of alkyl acrylates, the alkyl methacrylates, the dialkyl maleates and the dialkyl fumarates of the lower (1–6 carbon) monohydric primary aliphatic alcohols; and (c) 0.01 to 10% by weight of a monomer of the group consisting of: the monoacrylates and monomethacrylates of glycols of the group consisting of ethylene glycol, 1,2-propylene glycol, 1,4-butanediol and 1,6-hexanediol; 2-hydroxy-3-aminopropyl allyl ether, allyl glycerol ether, 2-dimethylaminoethyl acrylate, 2-dimethylaminoethyl methacrylate and N-vinyl pyrrolidone; and acrylic and methacrylic acids, said terpolymer having been made by a free-radical initiated polymerization of a mixture of ethylene, said group (b) monomer and said group (c) monomer.

2. A terpolymer according to claim 1 wherein the group (c) monomer is acrylic acid.

3. A terpolymer according to claim 1 wherein the group (c) monomer is methacrylic acid.

4. A terpolymer according to claim 1 wherein the group (c) monomer is 2-hydroxethyl methacrylate.

5. A terpolymer of at least 65% by weight of ethylene, at least 5% by weight of ethyl acrylate and 0.01 to 10% by weight of acrylic acid, said terpolymer having been made by a free-radical initiated polymerization of a mixture of ethylene, ethyl acrylate and acrylic acid.

6. A terpolymer of at least 65% by weight of ethylene, at least 5% by weight of ethyl acrylate and 0.01 to 10% by weight of methacrylic acid, said terpolymer having been made by a free-radical initiated polymerization of a mixture of ethylene, ethyl acrylate and methacrylic acid.

7. A terpolymer of at least 65% by weight of ethylene, at least 5% by weight of methyl methacrylate and 0.01 to 10% by weight of acrylic acid, said terpolymer having been made by a free-radical initiated polymerization of a mixture of ethylene, methyl methacrylate and acrylic acid.

8. A terpolymer of at least 65% by weight of ethylene, at least 5% by weight of methyl methacrylate and 0.01 to 10% by weight of methacrylic acid, said terpolymer having been made by a free-radical initiated polymerization of a mixture of ethylene, methyl methacrylate and methacrylic acid.

9. A terpolymer of at least 65% by weight of ethylene, 20 to 30% by weight of ethyl acrylate and 0.1 to 7% by weight of acrylic acid, said terpolymer having been made by a free-radical initiated polymerization of a mixture of ethylene, ethyl acrylate and acrylic acid.

10. A terpolymer of at least 65% by weight of ethylene, 20 to 30% by weight of ethyl acrylate and 0.1 to 7% by weight of methacrylic acid, said terpolymer having been made by a free-radical initiated polymerization of a mixture of ethylene, ethyl acrylate and methacrylic acid.

11. A terpolymer of at least 65% by weight of ethylene, 20 to 30% by weight of methyl methacrylate and 0.1 to 7% by weight of acrylic acid, said terpolymer having been made by a free-radical initiated polymerization of a mixture of ethylene, methyl methacrylate and acrylic acid.

12. A terpolymer of at least 65% by weight of ethylene, 20 to 30% by weight of methyl methacrylate and 0.1 to 7% by weight of methacrylic acid, said terpolymer having been made by a free-radical initiated polymerization of a mixture of ethylene, methyl methacrylate and methacrylic acid.

References Cited by the Examiner

UNITED STATES PATENTS 2,599,123   6/52   Pinkney _____ 260—78.5

FOREIGN PATENTS 849,066   9/60   Great Britain.

JOSEPH L. SCHOFER, *Primary Examiner.*

M. LIEBMAN, LEON J. BERCOVITZ, *Examiners.*